United States Patent [19]
Lema

[11] 3,807,492
[45] Apr. 30, 1974

[54] HEAT EXCHANGER ATTACHMENT
[75] Inventor: Leo A. Lema, Racine, Wis.
[73] Assignee: Modine Manufacturing Company, Racine, Wis.
[22] Filed: June 19, 1972
[21] Appl. No.: 264,134

[52] U.S. Cl. .............................................. 165/76
[51] Int. Cl. ............................................. F28f 5/00
[58] Field of Search ...... 285/387, 393; 165/76, 171, 165/181; 113/118; 29/157.3 R

[56] References Cited
UNITED STATES PATENTS
| | | | |
|---|---|---|---|
| 3,397,901 | 8/1968 | Larrivee | 285/393 X |
| 2,948,034 | 8/1960 | Mehalick et al. | 165/182 |
| 2,268,369 | 12/1941 | Askin | 29/157.3 R |
| 1,352,256 | 9/1920 | Erickson | 285/393 |

Primary Examiner—Charles J. Myhre
Assistant Examiner—Theophil W. Streule, Jr.
Attorney, Agent, or Firm—Hofgren, Wegner, Allen, Stellman & McCord

[57] ABSTRACT

The method of making a heat exchanger in which the heat exchanger is made up of an assembly of parts bonded together by a set previously flowable bonding composition with the parts including a tubular fluid fitting for heat exchange fluid flow in relation to the interior of the heat exchanger, the tubular fitting extending from the heat exchanger and having smooth external surfaces in combination with a laterally separable screw threaded member defining a smooth surface grasping the fitting at its smooth surface to provide for attaching a cooperating screw threaded member to the fitting.

4 Claims, 4 Drawing Figures

PATENTED APR 30 1974 3,807,492

HEAT EXCHANGER ATTACHMENT

BACKGROUND OF THE INVENTION

This invention relates to heat exchanger in which the uniting of the parts of the heat exchanger utilizes a flowable bonding composition. Because there is an absence of screw threaded or similarly indented surfaces on the fitting which provides for fluid flow into or out of the exchanger there is no danger of filling such screw threads with the bonding composition which then must be laboriously dug out. Instead, the part with the screw threads is not incorporated into the fitting until after the fluid bonding has been completed.

It is customary in making heat exchangers such as automotive air conditioning condensers and evaporators to assemble the parts including fins, tubes, headers, tanks and inlet and outlet tubular fittings and then bond the assembled parts together in a bonding operation. In recent years it has been customary to use a fluid bonding composition that is then set to a solid state to unite the parts. Such a bonding composition, for example, is shown in Simpelaar U.S. Pat. No. 3,301,688 which discloses a composition that is in liquid form so that the parts of the heat exchanger can be dipped into the composition and then through a heating process set to a solid bonding material.

It has been found that where the fittings have the customary screw threads for connecting to refrigerant pipes, for example, the threads become filled with the solid bonding material which must be laboriously dug out and removed before the heat exchanger can be used. The method of this invention avoids this difficulty as the fittings are not provided with screw thread surfaces until after the bonding operation.

DESCRIPTION OF THE PREFERRED EMBODIMENT

The above drawings illustrate one embodiment of the method of making a heat exchanger and one embodiment of the heat exchanger itself of this invention.

Figure 1:
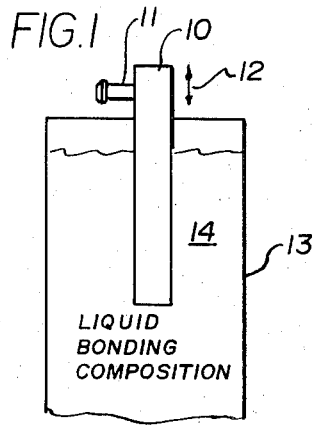
FIG. 1 is a semi-schematic view illustrating a step in the method of the invention.
Figure 2:
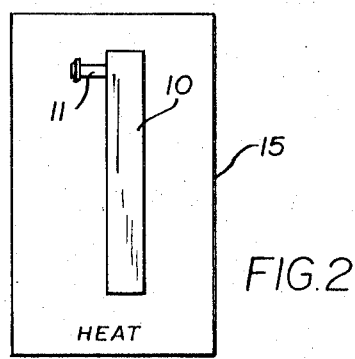
FIG. 2 is a similar view but showing a further step in the method of manufacture.

In the illustrated embodiment of the method as shown in FIGS. 1 and 2 the assembled parts of the heat exchanger 10 including a tubular fitting 11 (the holding jigs being omitted) are immersed into and removed from, as indicated by the arrow 12, a tank 13 of a liquid bonding composition 14. This liquid may be of the type disclosed in the above Simpelaar patent or any other flowable bonding or brazing composition.

Figure 3:
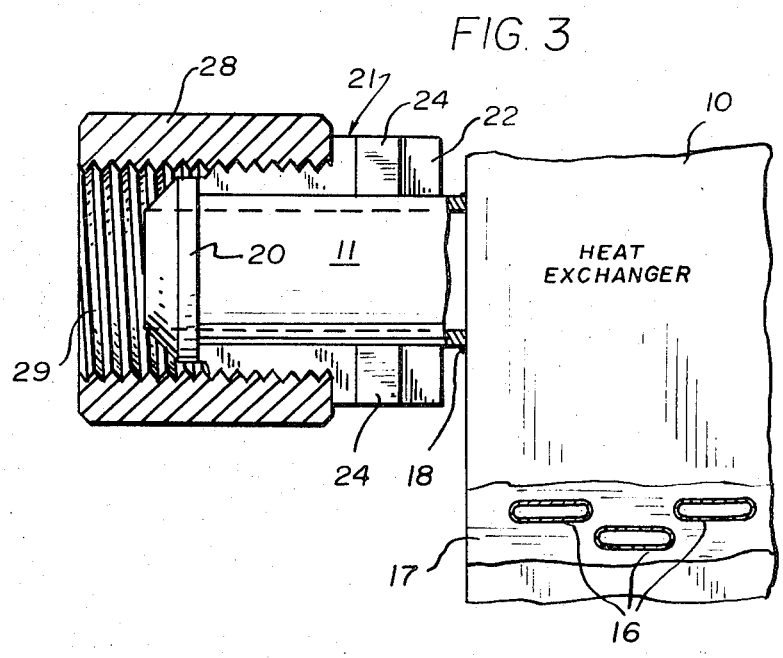
FIG. 3 is a fragmentary side elevational view partially broken away and partially in section illustrating a heat exchanger embodying the invention.

After the dipping of the assembled parts of the heat exchanger 10 into the liquid 14 the assembly is removed from the liquid, drained and then the liquid coated assembly is heated in a heating chamber shown schematically at 15 in FIG. 3.

Figure 4:
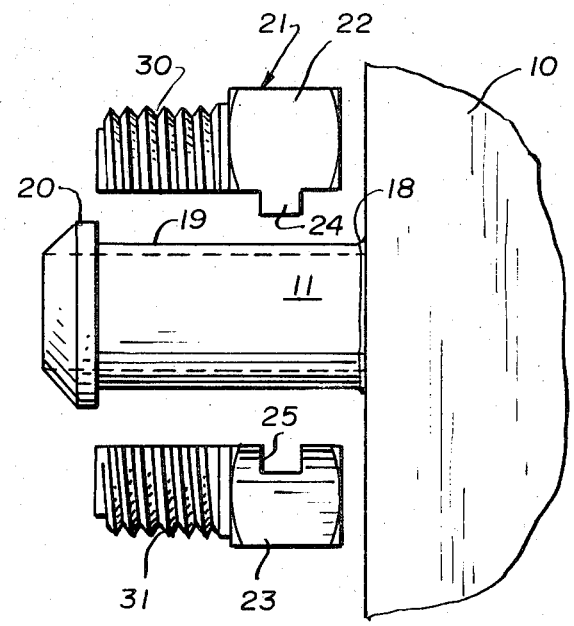
FIG. 4 is a view similar to FIG. 3 but omitting the threaded nut and showing the laterally separable screw threaded bolt member in an exploded view.

As shown in FIGS. 3 and 4 the tubular fitting 11 is securely attached to the heat exchanger 10 which includes the usual parallel tube sections 16 and spaced fins 17 by deposited bonding metal shown somewhat exaggerated at 18.

The fitting 11 before and during the bonding has an absence of the customary screw threads and, in fact, has only smooth surfaces including the outer surface 19. Thus there are no threaded surfaces that would tend to be filled with bonding metal 18 during the bonding operation.

The fitting 11 has an integral circular flange 20 on its outer end and between this flange and the heat exchanger 10 there is positioned a split screw threaded member 21, here shown as a bolt, made up of two semi-cylindrical parts 22 and 23 with one part 22 having aligned transverse ridges 24 held in similar grooves 25 in the opposite part 23.

When the parts 22 and 23 are assembled with their inner surfaces contacting the smooth outer surface 19 of the fitting the parts are held in this assembled relationship by engagement of a cylindrical nut 28 having internal threads 29 with the aligned external threads 30 and 31 on the bolt parts 22 and 23. This nut 28 is then used also to retain a threaded connector for a fluid tube such as a refrigerant tube (not shown) in the customary manner.

As can be seen from the above, the method and the heat exchanger of this invention permits bonding the assembled parts of the heat exchanger with a fluid bonding composition without being concerned about the filling of screw threads with the bonding material which would then have to be laboriously removed as is the case at present. Instead, the bonding of the parts is all completed before any screw threaded connectors are associated with the fitting or fittings of the exchanger.

Having described my invention as related to the embodiment shown in the accompanying drawings, it is my intention that the invention be not limited to any of the details of description, unless otherwise specified, but rather be construed broadly within its spirit and scope as set out in the appended claims.

I claim:

1. A heat exchanger comprising: an assembly of parts coated and bonded together by a set flowable bonding composition, the parts including a tubular fluid fitting for exchange fluid extending from the heat exchanger with the fitting having a smooth external primary coated surface and a laterally separable screw threaded member defining a smooth cylindrical inner surface; and means for causing said threaded member to embrace said external surface of the fitting over substantially the entire said inner surface.

2. The heat exchanger of claim 1 wherein said fitting is provided with an externally raised section spaced from the heat exchanger with the separable parts being positioned against said section and between the section and the heat exchanger.

3. The heat exchanger of claim 1 wherein the last named means comprises a threaded mating member engaging the threads of said separable parts for retaining said parts on the fitting and for subsequent attaching of a fluid conduit to said fitting.

4. The heat exchanger of claim 3 wherein said fitting is provided with an externally raised section spaced from the heat exchanger with the separable parts being positioned against said section and between the section and the heat exchanger.

* * * * *